United States Patent [19]
Bandyopadhyay et al.

[11] 3,821,355
[45] June 28, 1974

[54] RECOVERY OF SULFUR AND METAL VALUES FROM SULFUR BEARING MINERALS

[75] Inventors: Bhaskar Bandyopadhyay, Camillus, N.Y.; Charles P. Bruen, Bernardsville, N.J.; Christian A. Wamser, Camillus, N.Y.

[73] Assignee: Allied Chemical Corporation, New York, N.Y.

[22] Filed: May 8, 1972

[21] Appl. No.: 251,634

[52] U.S. Cl. ............... 423/139, 423/542, 423/563, 423/574, 423/632
[51] Int. Cl. ..... B01g 1/04, C01b 17/52, C01b 17/02
[58] Field of Search ........... 423/139, 542, 563, 574, 423/632, 633

[56] References Cited
UNITED STATES PATENTS
| | | | |
|---|---|---|---|
| 1,415,897 | 5/1922 | Reed | 423/574 |
| 2,043,084 | 6/1936 | Ward et al. | 423/574 |
| 3,522,002 | 7/1970 | Lefevre | 423/139 |
| 3,690,827 | 9/1972 | Garrett | 423/139 |

*Primary Examiner*—Oscar R. Vertiz
*Assistant Examiner*—Hoke S. Miller
*Attorney, Agent, or Firm*—Gerard P. Rooney; Jack B. Murray, Jr.

[57] ABSTRACT

Pyrites tailings and smelter gas, by-products of smelters, are treated to recover iron values and elemental sulfur by a combination of: roasting the pyrites to produce elemental sulfur and iron sulfide; converting the iron sulfide with an acid cation exchange resin to liberate $H_2S$ and adsorb ferrous iron; reacting the smelter $SO_2$ gas with a carbonyl compound to produce alpha hydroxy sulfonic acid; adding the a-hydroxy sulfonic acid to the cation exchange resin containing iron to regenerate the cation exchange resin, and recycling; heating the ferrous hydroxy sulfonate formed, to produce ferrous sulfite and liberate the carbonyl compound; calcining the ferrous sulfite to liberate $SO_2$, producing by-product ferrous oxide, and reacting the liberated $SO_2$ with the liberated $H_2S$ to produce elemental sulfur.

11 Claims, 1 Drawing Figure

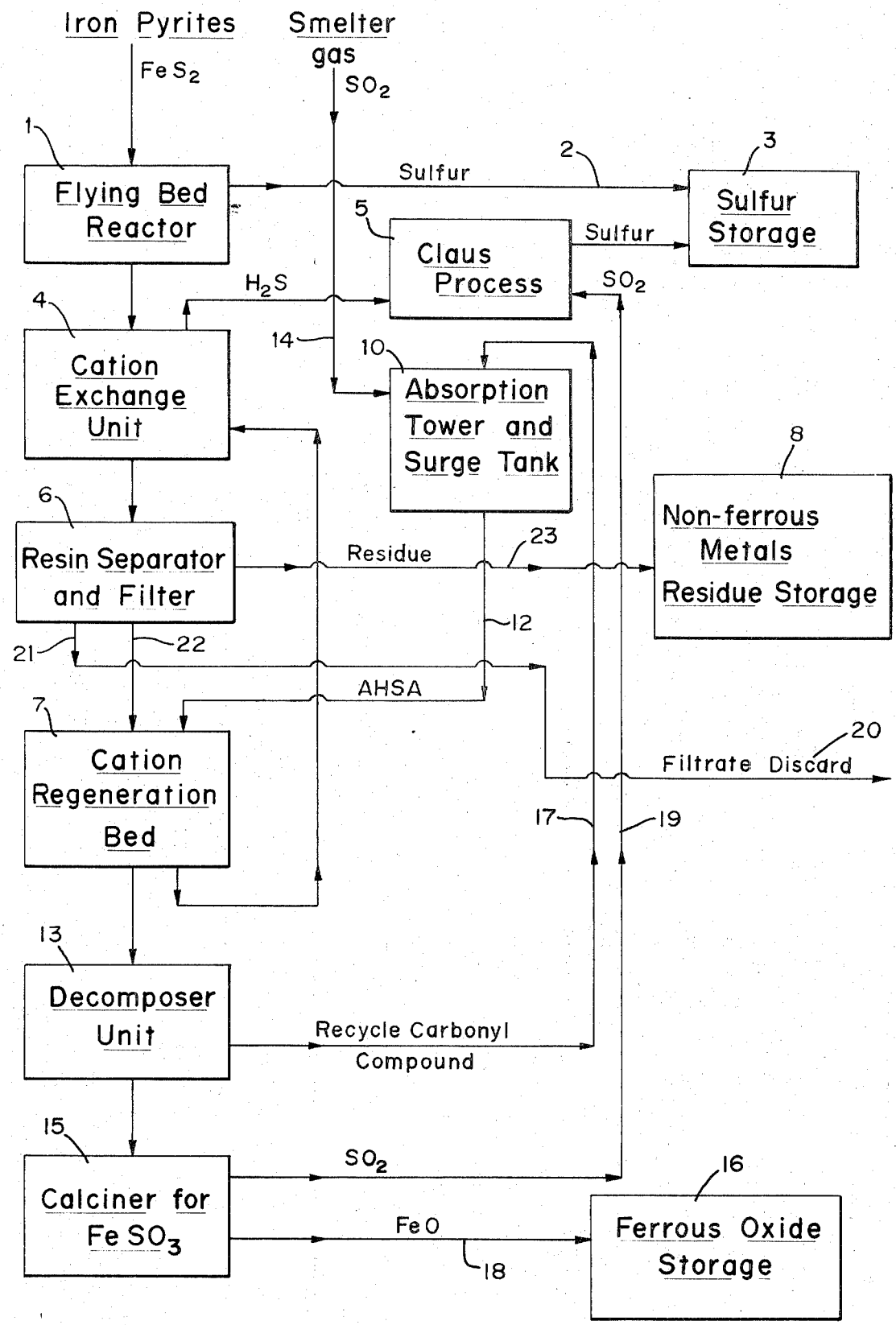

RECOVERY OF SULFUR AND METAL VALUES FROM SULFUR BEARING MINERALS

BACKGROUND OF THE INVENTION

This invention relates to a method whereby low cost iron pyrites or other sulfide minerals containing iron and other metal values in small amounts (copper, vanadium, molybdenum, silver, etc.) may be processed with waste smelter gas ($SO_2$) to recover both sulfur and the aforementioned metals.

Pyrites tailings and smelter gas are by-products of the copper smelters of our Southwest, and the disposal of this gas poses a serious and costly problem. The smelters are under constant pressure to stop polluting the atmosphere, consequently any means of utilizing these wastes to advantage would be welcomed by the industry.

SUMMARY OF THE INVENTION

The present invention is particularly directed to a novel assemblage of process steps which starts with low cost iron pyrites (or other sulfide mineral) and smelter gas ($SO_2$), and produces two primary articles of commerce, namely elemental sulfur and ferrous oxide, the latter being of value to the iron industry. In addition, metals found in the ore in minor amounts are separated in the form of their sulfides and stockpiled. These metals may subsequently be separated and refined by conventional methods, if desired.

Only make-up quantities of auxiliary materials used in the process are required since they are all recycled. Even that portion of the smelter gas used to produce a-hydroxy sulfonic acid, is regenerated and recycled.

Briefly, the method of the present invention may be summarized as follows:

A. The sulfide mineral is treated with an acid cation exchange resin such as one of the polystyrene sulfonic acid type, for example, Dowex 50, in a reactor wherein sulfur is separated as hydrogen sulfide.

B. The hydrogen sulfide is permitted to react with $SO_2$ gas according to known methods (the "Claus" process), to recover sulfur.

C. The particles or beads of resin which have adsorbed the ferrous iron ($Fe^{++}$) are separated from the aqueous solution by screening.

D. The insoluble residue remaining in the aqueous solution after separation of the resin beads, may contain the sulfides of copper, molybdenum, vanadium, silver and other metals in small amounts. This residue may be removed by filtration for processing by conventional means to isolate the metallic components. The filtrate is discarded.

E. The cation exchange resin in $Fe^{++}$ form is reconverted to the H-ion form for recycle, by bringing it into contact with an aqueous solution of an a-hydroxy sulfonic acid. This is prepared by absorbing $SO_2$ (smelter gas) in an aqueous solution of an aldehyde such as formaldehyde or a ketone such as acetone.

F. The carbonyl values and part of the $SO_2$ values are recovered at this point by distillation. Heating the ferrous hydroxy sulfonate, which hydrolyzes at boiling temperature, frees the carbonyl compound and about half of the contained $SO_2$ which are then recovered from the vapors by condensation. Actually, the $SO_2$ reacts directly with an equivalent amount of the carbonyl compound, during the recovery process, so that the recovered distillate consists of a mixture of reconstituted a-hydroxy sulfonic acid, and the carbonyl compound. The iron is obtained as hydrated ferrous sulfite, which may be filtered off. If the distillation is not carried to dryness, any aldehyde or ketone remaining in solution is combined with that recovered by distillation during the hydrolysis, and the a-hydroxy sulfonate is reconstituted by the addition of more smelter gas. The ferrous sulfite isolated above is calcined under mild conditions to obtain a relatively pure sulfur dioxide, and ferrous oxide. The latter when pelletized, has value as a blast furnace feed.

If the sulfide mineral is of a type, such as iron pyrites ($FeS_2$) which will give up part of its sulfur in the elemental form when heated in an oxygen-free atmosphere, then prior to resin treatment of step "A" above, the sulfide mineral is subjected to thermal decomposition at temperatures up to 1,200°C. to desulfurize the charge to essentially FeS (ferrous sulfide) in a fluid or "flying bed" operation. This step is carried out using known technology in a neutral air-free atmosphere. The vaporized sulfur is recovered by condensation.

A better understanding of the process of the present invention may be had by reference to the accompanying flow diagram.

DESCRIPTION OF THE PREFERRED EMBODIMENTS

Referring to the drawing

If the sulfur bearing mineral which serves as raw material consists of iron pyrites ($FeS_2$) as, for example, the by-product pyrites tailings of the copper smelting industry, substantially half of the contained sulfur can be obtained by roasting the finely divided mineral in a substantially oxygen-free atmosphere. Numeral 1 designates the pyrites desulfurizing unit, preferably a reactor of the so called "flying bed" type (a modified fluid bed reactor operating at a high linear gas velocity). Temperatures of about 670° to 1,200°C. may be used, with those in the higher range serving to accelerate the desulfurization step.

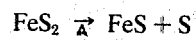

The sulfur vapor is condensed and transferred via line 2 to storage at 3.

The desulfurized pyrites, now ferrous sulfide, is transferred to vessel 4, for treatment with a cation exchange resin.

In the circumstance that the raw material sulfur-bearing ore or mineral is essentially ferrous sulfide, as is the case with pyrrhotite, then the desulfurization operation in reactor 1 is by-passed, and the sulfur bearing mineral, which must be in a finely divided state, is charged directly into unit 4, which is an agitated vessel. We have now found, surprisingly, that the cation exchange resin will react directly with the insoluble ferrous sulfide in an aqueous medium, the reaction proceeding to completion, with the ferrous ion being adsorbed by the exchange resin. When it is considered that both of the reactants are insoluble in water, and that the ferrous sulfide in particular, is extremely insoluble, the novelty of the reaction can be appreciated.

The ferrous sulfide in vessel 4 is agitated with an aqueous slurry of a cation exchange resin, preferably in an amount somewhat in excess of that theoretically required to adsorb all of the ferrous iron. The amount of water employed is not critical. Sufficient water should be used to provide a workable slurry.

To aid in the expulsion of the hydrogen sulfide, the slurry is preferably warmed, but temperatures in excess of 80°C should generally be avoided, as detrimental to the resin. Substantially all of the H₂S is evolved in about 2 hours. This acid cation exchange resin is preferably of the divinylbenzene-polystyrene copolymer sulfonic acid type.

Generally speaking, acidic cation exchange resins which are readily regenerated, are operable in the process of this invention. Among those proprietary resins which may suitably be employed in this step are: Amberlite IR–120, Rohm and Haas Co., Phila., Pa.; Dowex 50, Dow Chemical Co., Midland, Mich; Nalcite HCR, National Aluminate Corp., Chicago, Ill.; Permutit-RS and Zeocarb–215, Permutit Co., New York, N.Y.; Duolite C–10, C–20 and C–25, Diamond Shamrock Co., Redwood City, Calif.; and Lewatit S–100, Farbenfabriken Bayer, Leverkusen, West Germany.

The evolved H₂S passes to a conventional "Claus" process unit 5, where it reacts with sulfur dioxide to produce elemental sulfur according to the reaction:

$$2H_2S + SO_2 \rightarrow 2H_2O + 3S$$

The sulfur produced is shown as stored in vessel 3. In the preparation of sulfur by the Claus process, it is advantageous to use an SO₂ feed which is concentrated, for as the feed gas is diluted, the efficiency of the conversion drops. Smelter gas, however, is generally not only dirty, containing "fly ash," but quite dilute. An important feature of the present process, however, is that substantially pure undiluted SO₂ is provided by the process itself, and in an amount sufficient to react with the H₂S provided by the action of the cation exchange resin on the ferrous sulfide. It is preferable therefore, that this concentrated SO₂ gas be used in the Claus process rather than the smelter gas, thus insuring efficient conversion, and a clean sulfur product. An expensive concentration step for the smelter gas is also avoided. This feature will be discussed more fully, later.

The cation exchange unit 4 now contains the exchange resin with adsorbed ferrous ions, and the sulfides of any nonferrous metals present, such as vanadium, molybdenum, copper, silver, etc., which are substantially insoluble. The resin is therefore separated from the aqueous solution and residue by screening, and sent to a regeneration zone indicated at 7. The separated aqueous solution is then filtered. The filtrate is discarded, and the residue sent to storage 8 for possible separation and purification of the non-ferrous metals contained therein, by conventional methods. The concentration of these economically important metals in a manner which facilitates their recovery, is an ancillary advantage of this process, for several have sufficient value to make their separation economically attractive. In the flow sheet which represents a preferred embodiment of our invention, separation of the residue is accomplished in filter 6, with the filtrate discharged through line 21 and discarded, the beads of the cation exchange resin transferred through line 22 forming the cation exchange bed 7, and the residue, via line 23 to storage at 8.

In order to regenerate the resin with adsorbed ferrous iron, an aqueous solution of a-hydroxy sulfonic acid (AHSA) in tank 10 is allowed to enter cation exchange bed 7 through line 12, and to percolate, and if necessary, to recycle therethrough, until it has regenerated the resin and formed ferrous hydroxy sulfonate. This regeneration step is preferably and most conveniently, carried out in the cation exchange bed 7, although it is possible within the terms of our process, to carry it out in an agitated vessel, and thereafter to separate the ferrous hydroxy sulfonate from the resin which would then be ready for re-use. In the preferred method, the resin is regenerated in situ, and the ferrous hydroxy sulfonate drained from the bed into decomposer unit 13.

When the a-hydroxy sulfonic acid has been prepared from acetone and sulfur dioxide, $$SO_2 + H_2O + (CH_3)_2CO \rightarrow (CH_3)_2C(OH)SO_3H,$$

the action of the sulfonic acid on the resin having ferrous iron adsorbed thereon, may be represented as follows:

$$R_2Fe^{++} + 2CH_3)_2C(OH)SO_3H \rightarrow Fe[(CH_3)_2C(OH)SO_3]_2 + 2RH^+$$

The ferrous hydroxy sulfonate in decomposer 13 is now heated to at least about the boiling point, and the carbonyl compound (in this illustration, acetone) and about half of the contained sulfur dioxide are driven off and sent to absorption tower 10 via line 17 where they recombine. Since only about half of the SO₂ required to reconstitute the a-hydroxy sulfonic acid is present, the excess carbonyl compound is allowed to react with additional SO₂, preferably smelter gas (line 14), since utilizing waste smelter gas is one of the objects of this invention. The concentration of the smelter gas is not critical, although as generally received, the gas contains fly ash and other impurities. For this reason the introduction of a conventional cleaning step for the smelter gas is recommended. Of course the SO₂ can be supplied by other means within this process, such as by the burning of part of the H₂S produced during the treatment of the FeS with cation exchange resin, or from the calcining of ferrous sulfite in the final step. A feature of this process, however, is the fact that a dilute SO₂ gas such as smelter gas can be used in the production of this sulfonic acid complex, thus leaving the relatively pure, high strength, SO₂ gas sources available in the process, free for other uses such as the Claus process for the production of sulfur. Use of smelter gas in the production of the a-hydroxy sulfonic acid, provides a use for this gas which otherwise is frequently liberated into the atmosphere as a serious air pollutant. In practice, a surge tank as indicated, can be used for storing the carbonyl compound and SO₂ product from the decomposer 13, so as to even out the flow for proper balance with the smelter gas.

The a-hydroxy sulfonic acid solution is prepared by absorbing additional sulfur dioxide in an aqueous solution of a water soluble carbonyl compound, either a ketone or an aldehyde, preferably in an absorption tower through which the carbonyl compound is circulated.

Exemplary of carbonyl compounds suitable for use in the preparation of the complex sulfonic acid are water soluble $C_1$-$C_8$ aldehydes and ketones such as acetone, methyl ethyl ketone, acetaldehyde, formaldehyde, furfuraldehyde, isobutyraldehyde, cyclohexanone, benzaldehyde, methyl isobutyl ketone, mesityl oxide and salicylaldehyde. Formaldehyde, acetone and acetaldehyde are especially preferred.

The a-hydroxy sulfonic acid can be advantageously prepared at about room temperature by absorbing the SO₂ in an aqueous solution of the carbonyl compound.

Although the strength of the solution of the carbonyl compound in water is not critical, a solution is preferred which is obtained by dissolving 1 gram mol of the carbonyl compound in about 400 grams of water. In the case of acetone, this will give about a 12 percent solution. Increasing the concentration of the acetone beyond this point provides only a slight increase in the solubility of the $SO_2$ gas. To obtain the complex, the $SO_2$ may be passed into the solution until the pH becomes constant (generally at a pH of about 0.5). In the case of acetone, the use of a 12 percent solution would provide a final a-hydroxy sulfonic acid having the approximate composition: 11 percent acetone, 12 percent $SO_2$ and 77 percent $H_2O$.

If we assume that the a-hydroxy sulfonic acid has been prepared from acetone, then the decomposition of the ferrous hydroxy sulfonic acid in decomposer unit 13 (which was obtained when the cation exchange resin containing the adsorbed $Fe^{++}$ was regenerated with the a-hydroxy sulfonic acid), proceeds as follows:

$$Fe[(CH_3)_2C(OH)SO_3]_2 \rightleftarrows (CH_3)_2CO + FeSO_3 + H_2O + SO_2$$

Although the decomposition will take place at the boiling point, it is preferable to gradually raise the temperature to about 250°C. to thereby drive over the moisture and leave a substantially dry ferrous sulfite product.

The ferrous sulfite may be transferred to calciner 15 where it will decompose quite readily at temperatures between about 300° to 500°C., preferably between 425° to 475°C., to provide a relatively pure $SO_2$ and leaving behind ferrous oxide which in the flow sheet is transferred to storage at 16 via line 18. This ferrous oxide is of value to the iron and steel industry.

The $SO_2$ is of value for any purpose wherein a high purity $SO_2$ is required. Within the process it may be used to advantage in the Claus process (line 19). Two parts of $H_2S$ to one of $SO_2$ is the correct stoichiometric ratio for the gas feed to the Claus process.

If additional high purity $SO_2$ is desired, it may readily be obtained by burning a portion of the $H_2S$ obtained from the treatment of the ferrous sulfide with the cation exchange resin, thus supplementing that received from the calcination of the ferrous sulfite.

Example 1

This example illustrates the reaction of FeS (desulfurized pyrites) with an acidic cation exchange resin in its $H^+$ (acid) form, to liberate $H_2S$ from which the sulfur can subsequently be recovered by reaction with $SO_2$. All parts given are by weight.

100 Parts of ground pyrite (−200 mesh) were pyrolyzed in a nitrogen atmosphere in a tube furnace at 400°C. to drive off sulfur. About 73 parts of product were obtained which was confirmed to be essentially FeS. 26 Parts of sulfur were recovered.

7.5 Parts of the FeS thus obtained were transferred to a reaction vessel containing 100 parts of water and the stoichiometric amount of Dowex 50 cation exchange resin in $H^+$ form (1 liter wet resin has a capacity of 1.7 gram equivalents, corresponding to 75 grams FeS), the mixture having been heated to 80°C.

The $H_2S$ gas evolved from the reaction mixture was swept by a stream of nitrogen into an absorption vessel containing a known quantity of standard iodine solution so that periodic titration of aliquots of the absorber liquid provided estimates of the rate of $H_2S$ formation. The following data were obtained:

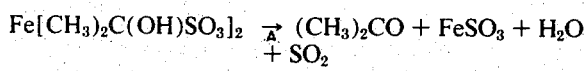

| Time (minutes) | 10 | 20 | 30 | 40 | 50 | 60 |
|---|---|---|---|---|---|---|
| Parts $H_2S$ evolved | 0.36 | 0.76 | 1.17 | 1.59 | 2.09 | 2.36 |
| % FeS reacted | 12.4 | 26.1 | 40.4 | 54.8 | 71.9 | 81.1 |

The Dowex 50 cation exchange resin which was in the form of beads, was screened from the solution and washed with a small amount of water, the wash liquor being added to the filtrate.

The beads with adsorbed $Fe^{++}$ were placed in a bed. The liquor separated from the beads contained a small amount of finely divided black residue comprising predominantly copper sulfide, with traces of the sulfides of silver and molybdenum. This residue was filtered off and held for possible separation and purification of the metals by conventional means. The filtrate consisting of substantially pure water, was then discarded.

The ion exchange resin, which is now largely in $Fe^{++}$ form, can be regenerated for re-use by passing a solution of acid complex through a column of it or by stirring it in several stages, batchwise, with an acid complex. The acid complex can be made from carbonyl compound reacted with $SO_2$, as illustrated below:

The spent ion exchange resin above, is loaded with ferrous iron $Fe^{++}$ and must be reconverted to the acid ($H^+$) form before it can be re-used.

In this example, the regenerating acid was made from a carbonyl compound, namely formaldehyde solution, and $SO_2$, as follows:

20 Parts of 36 percent formaldehyde solution were treated with 80 parts of water, and sulfur dioxide gas was passed through the solution until the pH dropped to a constant value (0.53). This resulted in the formation of a solution containing methane hydroxy sulfonic acid.

50 Parts of the Dowex 50 ion exchange resin containing 2.65 parts of adsorbed $Fe^{++}$ were stirred with successive portions (30 parts each) of the formaldehyde-sulfur dioxide solution in batchwise fashion at room temperature. After each treatment, the liquid was drained from the resin and analyzed for iron. The following data were obtained:

| Treatment | Total iron content of eluate (parts Fe) | Cumulative total iron removed from resin (parts Fe) | % Resin regenerated |
|---|---|---|---|
| 1 | 1.06 | 1.06 | 40 |
| 2 | 0.88 | 1.94 | 73 |
| 3 | 0.33 | 2.27 | 86 |
| 4 | 0.24 | 2.51 | 95 |

Example 2

This example is directed to the regeneration of the resin with an a-hydroxy sulfonic acid as in the latter part of Example 1, except that the resin is contained in a bed or column:

140 Parts of the formaldehyde-sulfur dioxide solution described in Example 1 were passed through 50 parts of Dowex 50 ion exchange resin containing 2.95 parts of adsorbed $Fe^{++}$, the resin being in the form of a columnar bed 28 cm high and 1.5 cm in diameter. Effluent fractions from the column were analyzed for Fe, with the following results:

| Cumulative volumes of effluent per volume of bed | Total iron content of individual column effluents (parts Fe) | Cumulative iron eluted from resin column (parts Fe) | % Resin regenerated cumulative |
|---|---|---|---|
| 0.4 | 0.05 | 0.05 | 2 |
| 0.8 | 1.04 | 1.09 | 37 |
| 1.2 | 1.10 | 2.19 | 74 |
| 1.6 | 0.41 | 2.60 | 88 |
| 2.0 | 0.21 | 2.81 | 95 |
| 2.4 | 0.09 | 2.90 | 98 |
| 2.8 | 0.04 | 2.94 | 99 |

Example 3

This example was carried out in the same manner as Example 2, with the exception that the regenerating acid was made from cyclohexanone as the carbonyl compound, rather than formaldehyde:

50 Parts of cyclehexanone and 200 parts of water were treated with a stream of $SO_2$ gas until the solution was saturated. At this point, 32 parts of $SO_2$ had been absorbed.

163 Parts of the resulting hydroxy sulfonic acid solution were passed through a bed of 54 parts of Dowex 50 ion exchange resin which had previously taken up 2.63 parts of $Fe^{++}$. Analysis of the effluent showed 2.39 parts of iron, corresponding to 91 percent regeneration of the resin.

Since certain changes may be made in carrying out the above process without departing from the scope of the invention, it is intended that all matter contained in the above description and examples shall be interpreted as illustrative and not in a limiting sense.

We claim:

1. A process for obtaining hydrogen sulfide and ferrous oxide from a sulfur-bearing iron ore containing ferrous sulfide which comprises, admixing the ore with an aqueous slurry of a cation exchange resin in hydrogen form to liberate hydrogen sulfide and to adsorb iron; treating the aqueous body with an alpha hydroxy sulfonic acid to regenerate the resin and to form a ferrous hydroxy sulfonate; separating said ferrous hydroxy sulfonate in aqueous medium from said regenerated resin; heating said aqueous medium to decompose the ferrous hydroxy sulfonate to ferrous sulfite; and roasting said ferrous sulfite to obtain sulfur dioxide and ferrous oxide.

2. A process for recovering sulfur and metal values from a sulfur-bearing iron ore containing ferrous sulfide which comprises, admixing the ore with an aqueous slurry of an acidic cation exchange resin to liberate hydrogen sulfide and to adsorb iron; separating said resin from the aqueous body; adding an aqueous solution of an alpha hydroxy sulfonic acid to the separated resin to regenerate the resin and to form ferrous hydroxy sulfonate in aqueous medium; removing the regenerated cation exchange resin; and heating said aqueous medium to decompose the ferrous hydroxy sulfonate to ferrous sulfite.

3. The process of claim 2 wherein at least a portion of the hydrogen sulfide liberated is oxidized to produce sulfur dioxide.

4. The process of claim 2 wherein said alpha hydroxy sulfonic acid is prepared by reacting suflur dioxide and a water soluble carbonyl compound.

5. The process of claim 4 wherein the water soluble carbonyl compound is an aldehyde or ketone having a maximum of eight (8) carbon atoms.

6. The process of claim 2 wherein the ferrous sulfite is roasted to produce ferrous oxide and sulfur dioxide.

7. The process of claim 2 wherein the liberated hydrogen sulfide is reacted with sulfur dioxide to produce elemental sulfur.

8. A process for recovering sulfur and metal values from a sulfur-bearing iron ore containing ferrous disulfide ($FeS_2$) which comprises, roasting the ore to produce elemental sulfur; admixing the roasted ore with an aqueous slurry of an acidic cation exchange resin to liberate hydrogen sulfide and to adsorb iron; separating the said resin containing adsorbed iron from the aqueous body; adding an aqueous solution of an alpha hydroxy sulfonic acid to said separated resin to regenerate the resin and to form ferrous hydroxy sulfonate in aqueous medium; removing the regenerated cation exchange resin; heating said aqueous medium to decompose the ferrous hydroxy sulfonate to ferrous sulfite; and roasting the ferrous sulfite to produce ferrous oxide and sulfur dioxide.

9. A process for recovering sulfur and metal values from a sulfur-bearing iron ore containing ferrous disulfide ($FeS_2$) which comprises, roasting the ore to produce elemental sulfur; admixing the roasted ore with an aqueous slurry of an acidic cation exchange resin to liberate hydrogen sulfide and to adsorb iron; adding an alpha hydroxy sulfonic acid to the aqueous body containing said resin having iron adsorbed thereon to regenerate the resin and to form ferrous hydroxy sulfonate in aqueous medium; removing the regenerated cation exchange resin; heating said aqueous medium to decompose the ferrous hydroxy sulfonate to ferrous sulfite; and roasting the ferrous sulfite to produce ferrous oxide and sulfur dioxide.

10. A process for obtaining hydrogen sulfide and ferrous oxide from ferrous sulfide, comprising: admixing the ferrous sulfide with an aqueous slurry of a cation exchange resin in hydrogen form to evolve hydrogen sulfide, regenerating the cation exchange resin with an alpha hydroxy sulfonic acid and admixing the regenerated cation exchange resin with additional iron sulfide.

11. A process as defined in claim 10 wherein the ferrous sulfide is obtained by roasting $FeS_2$.

* * * * *